(12) United States Patent
Fuerst et al.

(10) Patent No.: US 7,797,322 B2
(45) Date of Patent: *Sep. 14, 2010

(54) NEGATIVE KEY MAPPING

(75) Inventors: Karl Fuerst, Wiesloch (DE); Florian Kresser, Lobbach (DE)

(73) Assignee: SAP AG, Walldorf (DE)

( * ) Notice: Subject to any disclaimer, the term of this patent is extended or adjusted under 35 U.S.C. 154(b) by 654 days.

This patent is subject to a terminal disclaimer.

(21) Appl. No.: 11/486,392

(22) Filed: Jul. 13, 2006

(65) Prior Publication Data

US 2008/0016063 A1 Jan. 17, 2008

(51) Int. Cl.
*G06F 7/00* (2006.01)
*G06F 17/30* (2006.01)

(52) U.S. Cl. ..................... 707/737; 707/802

(58) Field of Classification Search ............ None
See application file for complete search history.

(56) References Cited

U.S. PATENT DOCUMENTS 6,330,554 B1 * 12/2001 Altschuler et al. ............ 706/21
6,845,378 B1    1/2005 Pauly et al.

2003/0212654 A1    11/2003  Harper et al.

FOREIGN PATENT DOCUMENTS

EP    1638109 A2    3/2006

OTHER PUBLICATIONS

Jardine et al, A Model for Taxonomy, 1968, Mathematical Biosciences, vol. 2 Issues 3-4, pp. 464-582.*
Cole et al, An Improved Algorithm for the Jardine-Sibson method of generating overlapping clusters, 1970, The Computer Journal.*
Zha et al, Bipartite Graph Partitioning and Data Clustering, Nov. 5-10 2001, CIKM, 8 Pages.*
Muhamma, Breadth First Search, Verified Archived.org: Aug. 3, 2004, http://www.personal.kent.edu/~rmuhamma/Algorithms/MyAlgorithms/GraphAlgor/breadthSearch.htm.*
"International Applicationi Serial No. 07013503.3-2221, Extended European Search Report Nov. 27, 2007", 7 pgs.

* cited by examiner

*Primary Examiner*—Pierre M Vital
*Assistant Examiner*—Jason Liao
(74) *Attorney, Agent, or Firm*—Schwegman, Lundberg & Woessner, P.A.

(57) ABSTRACT

Performing a negative key mapping process includes determining whether objects contain substantially the same information, and storing a negative key mapping for the objects if the objects do not contain substantially the same information. In this context, the negative key mapping includes data indicating that the objects are different, at least in part.

22 Claims, 8 Drawing Sheets

NewCount = ExistingCount = SharingCount
→ α and β are identical.

Example:
NewCount = 4
ExistingCount = 4
SharingCount = 4

Strategy: no need to process β, nothing to do

ExistingCount > SharingCount and NewCount = SharingCount
→ β is a subset of α.

Example:
NewCount = 4
ExistingCount = 5
SharingCount = 4

Strategy: no need to process β, nothing to do

NewCount > SharingCount and ExistingCount = SharingCount
→ α is a subset of β

Example:
NewCount = 5
ExistingCount = 4
SharingCount = 4

Strategy: remove α, add β

NewCount > SharingCount and ExistingCount > Sharing
→ only a partial overlap of α and β

Example:
NewCount = 5
ExistingCount = 5
SharingCount = 4

Strategy: keep α and add β

NEGATIVE KEY MAPPING

TECHNICAL FIELD

This patent application relates, in general, to negative key mapping and to merging negatively key-mapped groups of objects.

BACKGROUND

A single entity, such as a company, may include multiple data management systems. For example, there may be a customer relationship management (CRM) system, a marketing system, and master system. These data management systems may each require copies of the same data object(s). For example, each data management system may require a customer record, which includes information such as a customer's name, address, telephone number, social security number, and the like.

Effective distribution of data objects to multiple data management systems may require a way to identify information in the data objects prior to distribution. Similarly, effective consolidation of data objects in a central system may benefit from knowledge of information in the data objects. For example, this knowledge can prevent duplicate copies of data objects from being stored, which can waste of valuable memory space. Heretofore, positive key mapping was used to identify objects containing identical, or substantially identical, content. In positive key mapping, an indication is stored in a database, which identifies two or more data objects as containing identical information.

SUMMARY

This patent application describes methods and apparatus, including computer program products, for performing negative key mapping and for merging negatively key-mapped groups of objects.

In general, in one aspect, the application is directed to determining whether objects contain substantially the same information, and storing a negative key mapping for the objects if the objects do not contain substantially the same information, where the negative key mapping comprise data indicating that the objects are different, at least in part. This aspect may also include one or more of the following features.

Determining whether objects contain substantially the same information may comprise comparing each of the objects to one or more others of the objects, where the comparing is performed either manually or via a computer program. Storing the negative key mapping may be performed via a unified key mapping service (UKMS). The storing may further comprise storing a positive key mapping for at least one of the objects via the UKMS, where the positive key mapping comprises data indicating that the at least one object is substantially identical to at least one other object.

The negative key mapping may comprise a first negative key mapping that defines a first group. The first group may be merged with a second negative key mapping that defines a second group to produce a merged group. Merging of the first and second groups may comprise discarding redundant objects from the merged group.

The negative key mapping may comprise a first negative key mapping that defines a first group of objects. The first group may be merged with a second negative key mapping that defines a second group of objects. Merging the groups may comprise assigning links between objects in the first and second groups, starting with a first object, tracing links until a last object is reached that does not have a link that connects at least to the first object, and assigning objects associated with traced links to a merged group. The first object may be part of the first group or the second group, and the last object may be part of the first group or the second group. Each link may comprise first and second vectors, where the first vector is a complement to the second vector in that the first vector points in a direction that is opposite to direction that the second vector points. Tracing the links may be performed via directions specified by vectors between objects. After tracing the first vector or the second vector of a link between two objects, an indication may be assigned to the first vector and the second vector to indicate the tracing.

The merged group may be a first merged group, and the following actions may be performed: after assigning, identifying a vector between objects that does not include the indication that indicates tracing, starting with an initial object, tracing links until a final object is reached that does not have a link that connects to the initial object and to all objects that were traced between the initial object and the final object, and assigning objects associated with traced links to a second merged group. The first and second groups may be replaced with the first merged group and the second merged group.

The foregoing aspect may be implemented via a system, an apparatus, a method, and/or a computer program product stored on one or more machine-readable media.

The details of one or more examples are set forth in the accompanying drawings and the description below. Further features, aspects, and advantages of the invention will become apparent from the description, the drawings, and the claims.

DESCRIPTION OF THE DRAWINGS

Like reference numerals in different figures indicate like elements.

DETAILED DESCRIPTION

Figure 1:
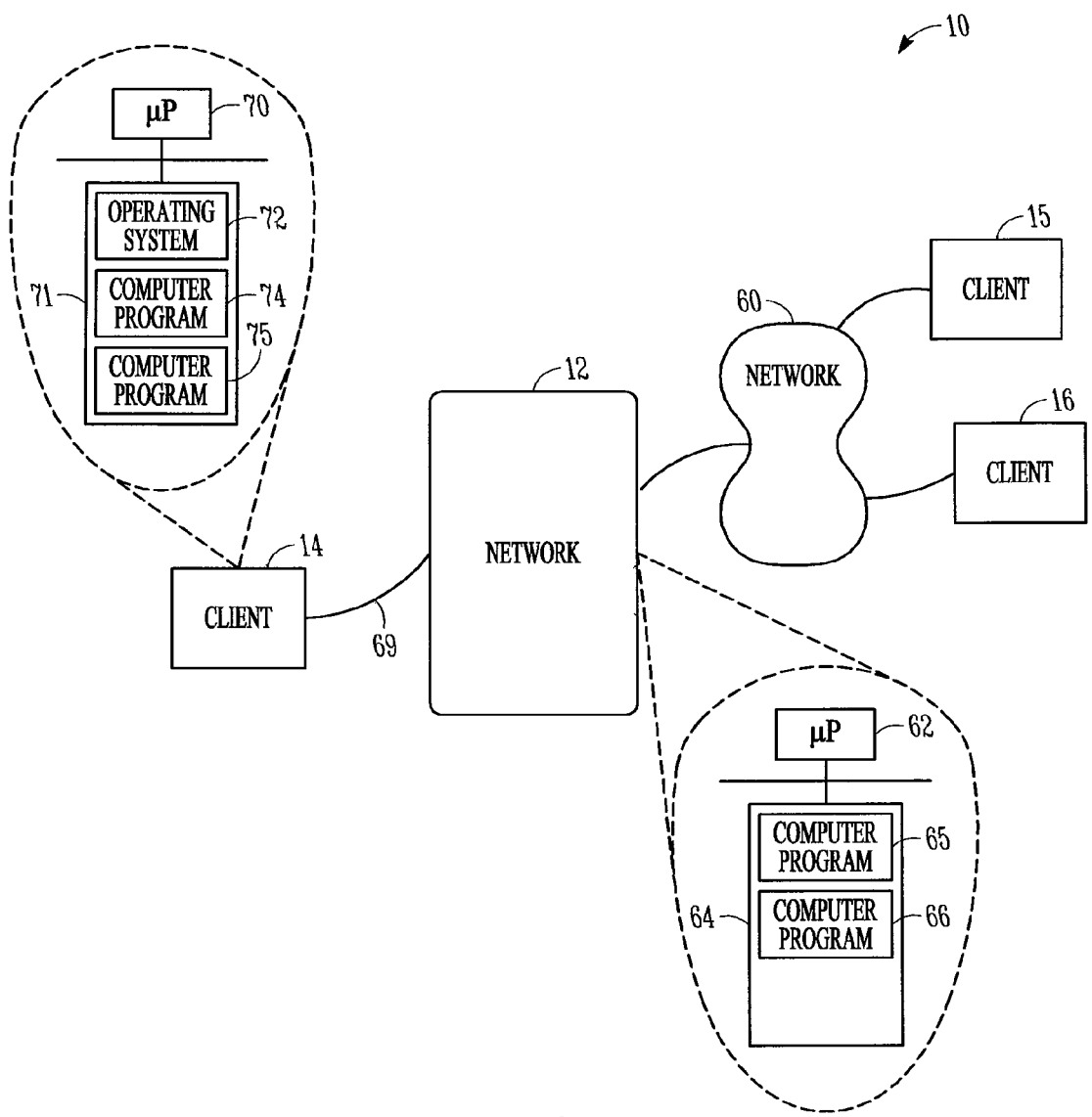
FIG. 1 is a block diagram of a computer system on which the processes described herein may be implemented.

FIG. 1 shows an example of a computer system 10, on which the processes described herein may be implemented. In this regard, it is noted that the processes are described below in the context of master data, which includes data objects, or simply "objects". The processes, however, are not limited to this particular use or implementation. As explained below, the processes may be used in the context of any process to perform negative key mapping and/or to merge groups of negatively key-mapped objects.

Computer system 10 includes a central server 12. Server 12 may include one or more devices to store a library of objects and to exchange these objects with one or more clients 14 to 16. The objects constitute master data. In this example, master data is information that is common to different locations and/or processes in a system landscape. Master data thus can be referenced by multiple systems and/or applications in the system landscape, such as, e.g., a product lifecycle management system, a customer relationship management system, a supply chain management system, and a manufacturing system, even if these systems are executed at different data processing systems.

As noted above, the master data includes objects. Briefly, an object is a collection of information that is grouped together and treated as a primitive in a data processing environment. Information stored in an object can be changed without concomitant changes to the data processing instructions that handle the object. The information in an object can be stored in a contiguous block of computer memory of a specific size at a specific location.

The master data may be relevant to data processing activities at different data processing devices. For example, master data may be relevant to data processing activities, such as interaction with a user at a client and to data processing activities, such as application software, at server 12. The master data may also be relevant to multiple applications at individual data processing devices.

As a consequence of this widespread relevance of master data collections, multiple, corresponding versions of the collections of master data may be stored individually at different data processing devices in computer system 10. Corresponding versions of the master data collections may include at least some identical information and may be maintained by master data management processes to ensure that this information remains harmonized at the different locations. The corresponding versions of the master data collections need not be identical. For example, a collection at one data processing device can be redacted based on the data processing activities commonly performed at that device or based on the data access rights that have been granted to users at that device.

Server 12 and clients 14 to 16 may each store a computer program for use in negatively key-mapping objects and merging groups of negatively key-mapped objects. In this context, negative key mapping includes storing, in a database, an indication that two or more objects contain information that is different, at least in part. Negative key mapping may be performed as part of an object distribution process (e.g., to distribute master data from the central server to different data processing devices) and/or as part of a consolidation process (e.g., during update of master data at the central server).

Figure 2:
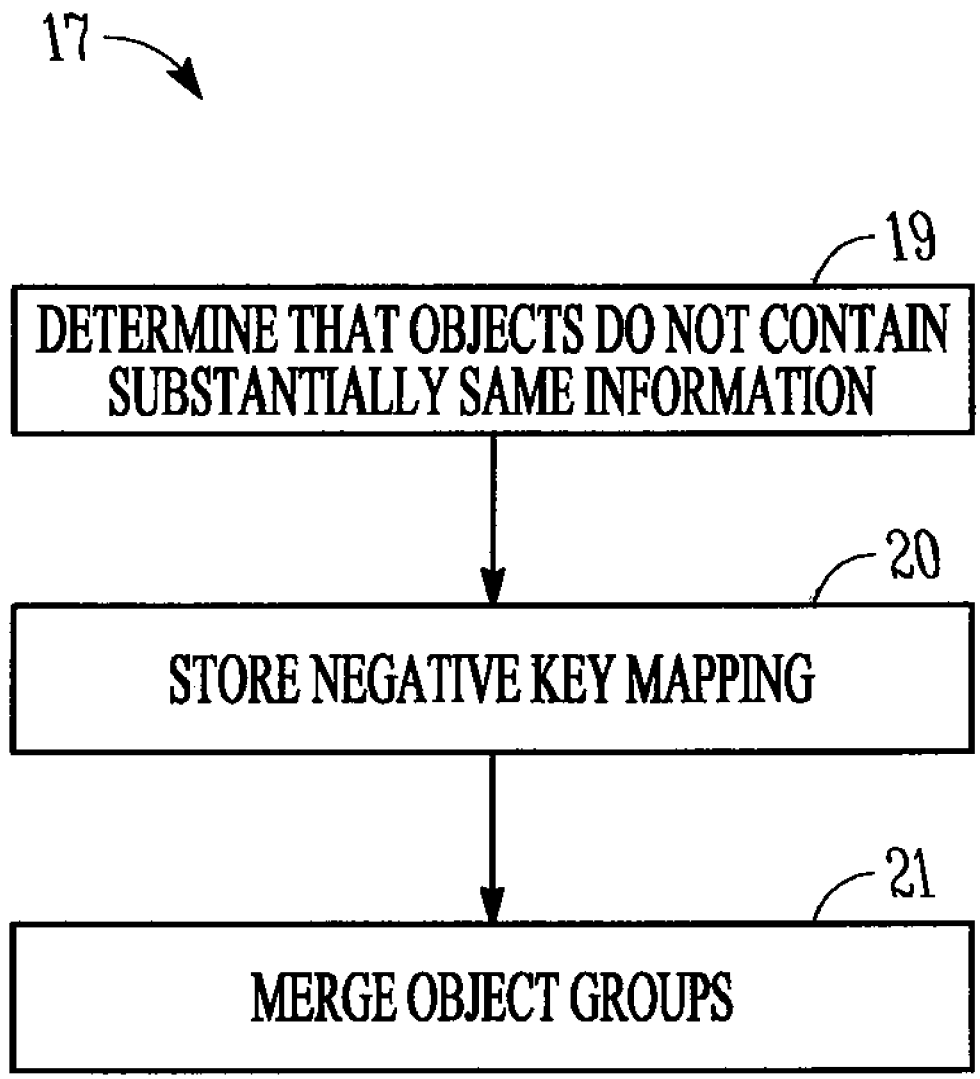
FIG. 2 is a flowchart showing a negative key mapping process.

FIG. 2 shows a process 17 for performing negative key mapping on objects. Process 17 may be performed by a computer program executing on server 12 and/or on one or more of clients 14 to 16. Process 17 is performed in conjunction with a unified key mapping service (UKMS) that is resident on the distributed landscape of FIG. 1. Briefly, the UKMS is a database management program that controls retrieval and storage of object key mapping information in a centralized database. This database may be located on server 12 or elsewhere on the computer system 10 of FIG. 1.

To perform negative key mapping, process 17 selects two designated objects and determines (19) if those two objects contain identical information. For example, the two objects may contain customer addresses. If the information in the two objects is identical, or contains only minor differences, then the objects may be positively key mapped via the UKMS. On the other hand, if the information in the two objects is different, then the objects may be negatively key-mapped via the UKMS. Finally, if it is unclear or unknown as to whether the two objects contain the same information, then no key mapping may be performed. It is noted that key mapping decisions can be made on more than two objects, even though this example describes using only two objects.

Comparison may be manual or automatic (e.g., performed without operator intervention). For example, a manual comparison may involve an operator eye-balling two objects in order to determine whether they contain the same, or different, information. An automatic comparison may involve executing a computer program that compares the two objects. The comparison may also include manual and automatic components. For example, parts of the two objects may be compared manually and parts automatically.

In some implementations, the comparison may involve assigning a score or percentage that is indicative of the similarity of two objects, and classifying the two objects accordingly. For example, if it is determined that two objects are 98% similar, then the two objects may be classified as identical. On the other hand, if the two objects are determined to be 50% similar, then two objects may be classified as different. The scores or percentages may be set as desired to indicate identity or difference, and may be implemented as part of automatic and/or manual comparison processes.

If it is determined, as a result of the comparison, that the two objects contain different information, process 17 stores (20) a negative key mapping for the two objects. In this implementation, process 17 communicates with the UKMS to store the negative key mapping. For example, process 17 sends, to the UKMS, data indicating that the two objects do not contain the same information. The data may identify the objects by an object ID (identifier) or by some other means. The data may also identify a negatively key-mapped group of objects to which the objects belong. In this context, a negatively key-mapped group of objects is a group of objects in which each object in the group contains information that is different from information in every other object in the group. For example, a negatively key-mapped group may contain objects A, B and C. In the negatively key-mapped group, A≠B, A≠C, and B≠C.

The UKMS receives, from process 17, the data indicating that the two objects do not contain the same information, and stores a negative key mapping for the two objects. For example, the UKMS may store (20) data, e.g., keys, indicating that the two objects are negatively key-mapped. If the two objects are part of a negatively key-mapped group, the UKMS may store data indicating that all objects in the group are negatively key-mapped to each other. In this implementation, a negatively key-mapped group is represented by a key group identifier (ID). All members of this group are stored as table lines with a primary key group ID and member IDs. For example, "Group Object" below is the key group ID, "Group 100" is the group ID, and Objects A, B and C are the member IDs.

Group Object
Group 100 Object A
Group 100 Object B
Group 100 Object C

Groups of positively key-mapped objects may be negatively key-mapped in accordance with process 17. For example, each member above, namely Objects A, B and C may actually each be a positively key-mapped group of objects.

New negatively key-mapped objects, or groups of objects, may be merged (21) with existing negatively key-mapped objects or groups. For example, when a new negatively key-mapped group (or simply "group") is added to the database, process 17 may perform one or more checks to determine whether the information contained in the new group is already present in the database and, if so, process 17 may not add the new group. Similarly, if the new group is a superset of an existing group in the database, process 17 may discard the existing group in favor of the new group, and add the new group to the database. Thus, merging objects may include discarding redundant objects from a merged group.

By way of example, assume that a new group includes objects A,B,C,D. An existing group containing objects A,B,C could be removed from the database, since that existing group is fully covered by the new group. On the other hand, an existing group A,B,E could not be removed or merged with the group A,B,C,D, since a resulting group A,B,C,D,E would contain the unintended mapping C≠E. Determinations as to which groups may be merged may be performed automatically and/or manually.

More detailed examples of simple mergers are shown in FIGS. 3 to 6, where two groups α and β are represented. In the context of FIGS. 3 to 6, a new count refers to the number of members (i.e., objects) of the new negatively key-mapped group β, an existing count refers to the number of members of the existing negatively key-mapped group α, and the sharing count refers to the number of members that are shared between α and β.

Figure 3:
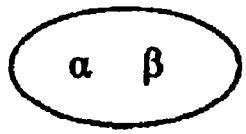
FIGS. 3, 4, 5 and 6 are diagrams showing relationships among objects in negatively key-mapped groups.
Figure 4:
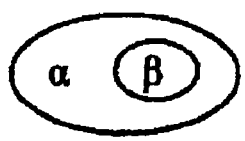
Figure 5:
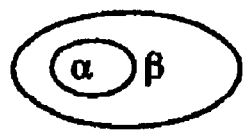
Figure 6:
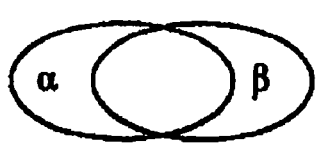

Referring to FIG. 3, α and β are identical; therefore, no action need be taken. That is, there is no need to add β to the database, since its content and relationships are already represented in the database by α. In FIG. 4, β is a subset of α, therefore, no action need be taken. As before, there is no need to add β to the database, since its objects and relationships are already covered by α. In FIG. 5, α is a subset of β; therefore, α is removed in favor of β. That is, since β contains all the object relationships of α, α is discarded and β is stored in the database. In FIG. 6, α and β only partially overlap. That is, α contains some object relationships that are not present in β, and β contains some object relationships that are not present in α. In this case, α remains in the database and β is added to the database. In another scenario, if α includes objects A,B, C,D, and sub-group A,B is deleted from the database, then the following new groups may be created: A,C,D and B,C,D in order to preserve the relationships A≠C, A≠D, B≠C, B≠D, and C≠D from the original α grouping. There may be some further merger of two or more groups in accordance with process 17, which is shown in FIG. 7 and described below.

Figure 8:
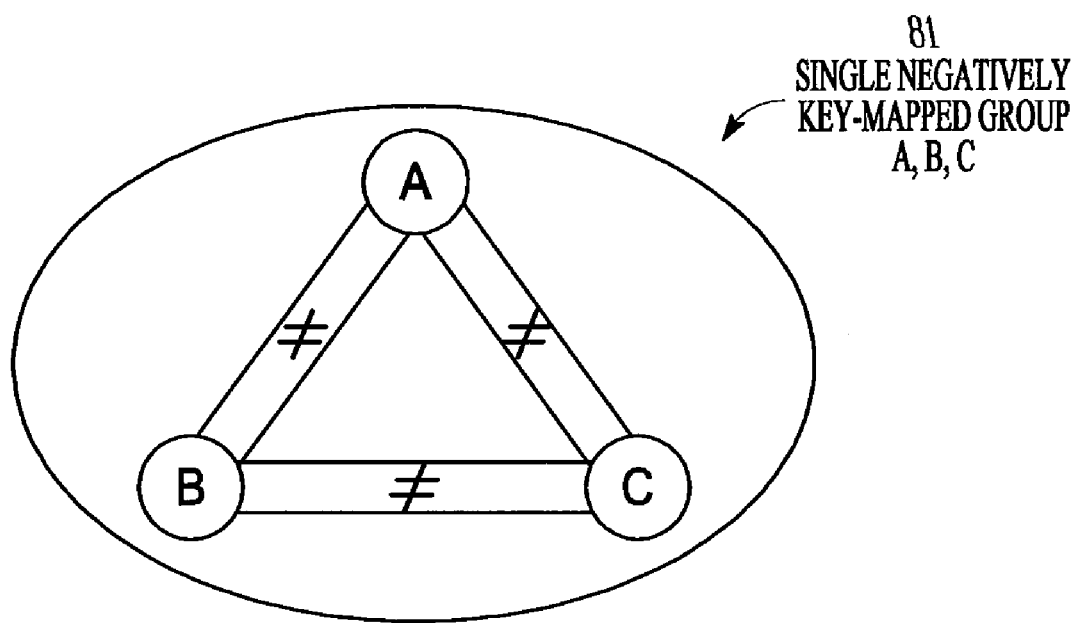
FIG. 8 is a diagram showing relationships among objects in a negatively key-mapped group.

In this regard, assume that there are two existing negatively key-mapped groups A,B and B,C in the UKMS-managed database. A new negatively key-mapped group A,C is to be added to the database. Using the simple merger rules explained above, the new group A,C may be added to the database; however, upon further examination it becomes apparent that the three groups can be merged into a single negatively key-mapped group A,B,C 81 as shown in FIG. 8. Logic for merging groups, such as these, recursively considers all groups that share members, as explained in more detail below.

Figure 9:
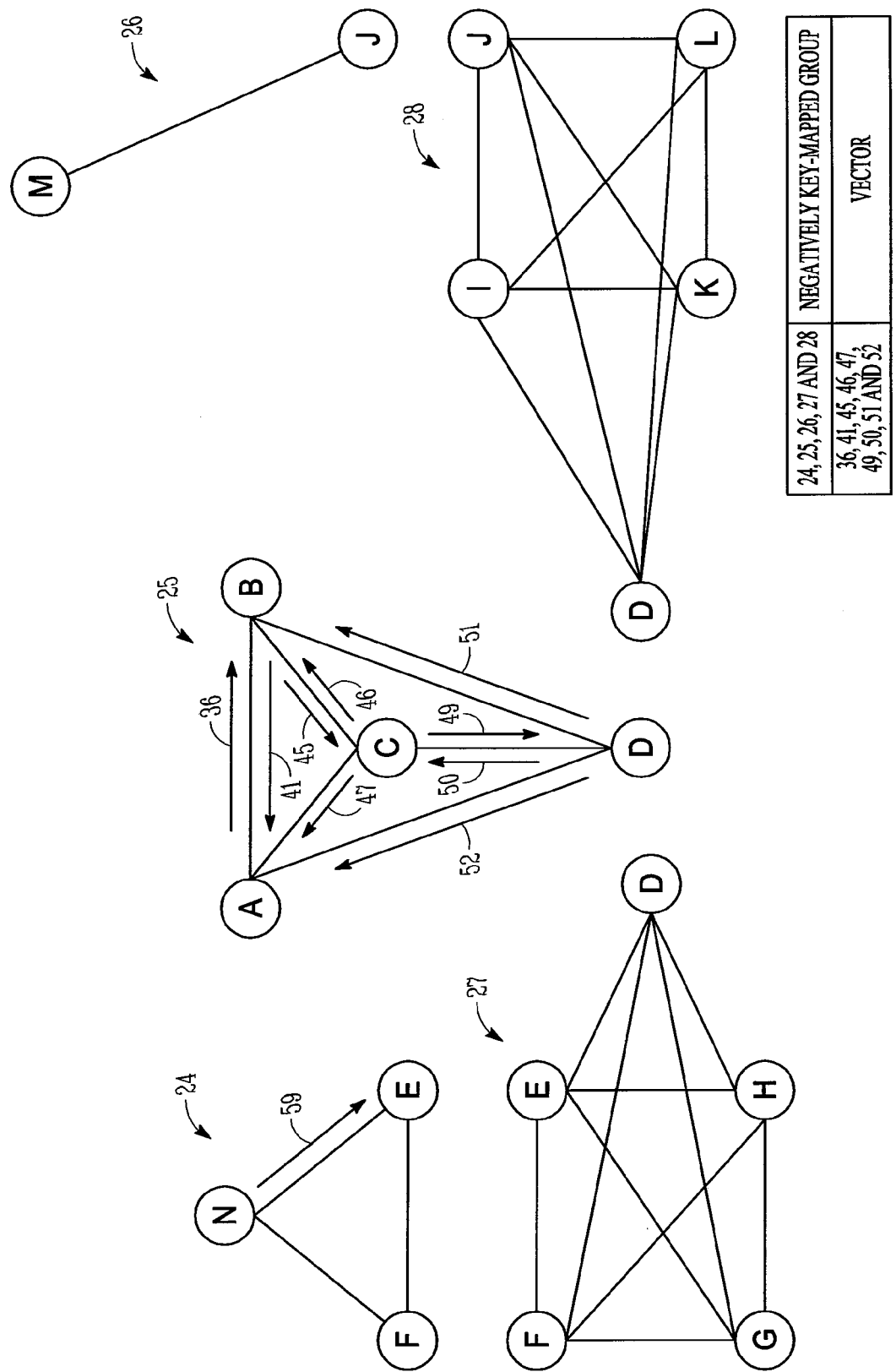
FIG. 9 is a diagram showing negatively key-mapped groups prior to merger.
Figure 10:
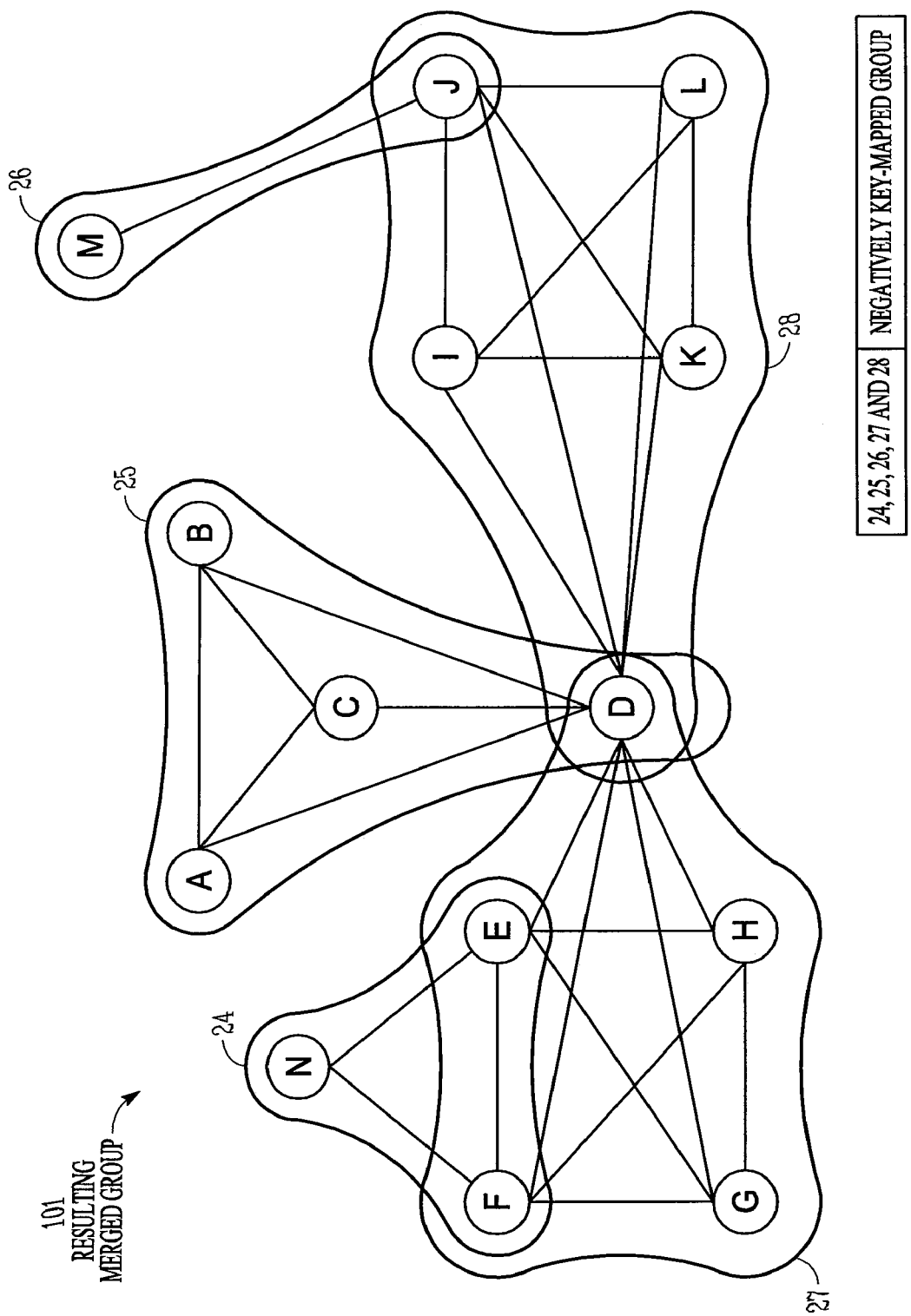
FIG. 10 is a diagram showing negatively key-mapped groups after merger.

FIG. 9 shows five negatively key-mapped groups 24 to 28, which may be stored in the UKMS-managed database. FIG. 10 shows relationships among the groups of FIG. 9 following merger. That is, in the merger process, the groups may be linked, meaning that objects may be shared between groups, thereby reducing the amount of objects that are stored in the database (i.e., by not storing, or discarding, duplicate objects). FIG. 7 shows a process 30 for producing the merged groups shown in FIG. 10. Process 30 is described below with respect to objects A, B, C and D (group 25). The remaining objects may be merged into groups in the same manner. It is noted that process 30 may also be used in place of the simple merging of block 21 (FIG. 2).

Figure 7:
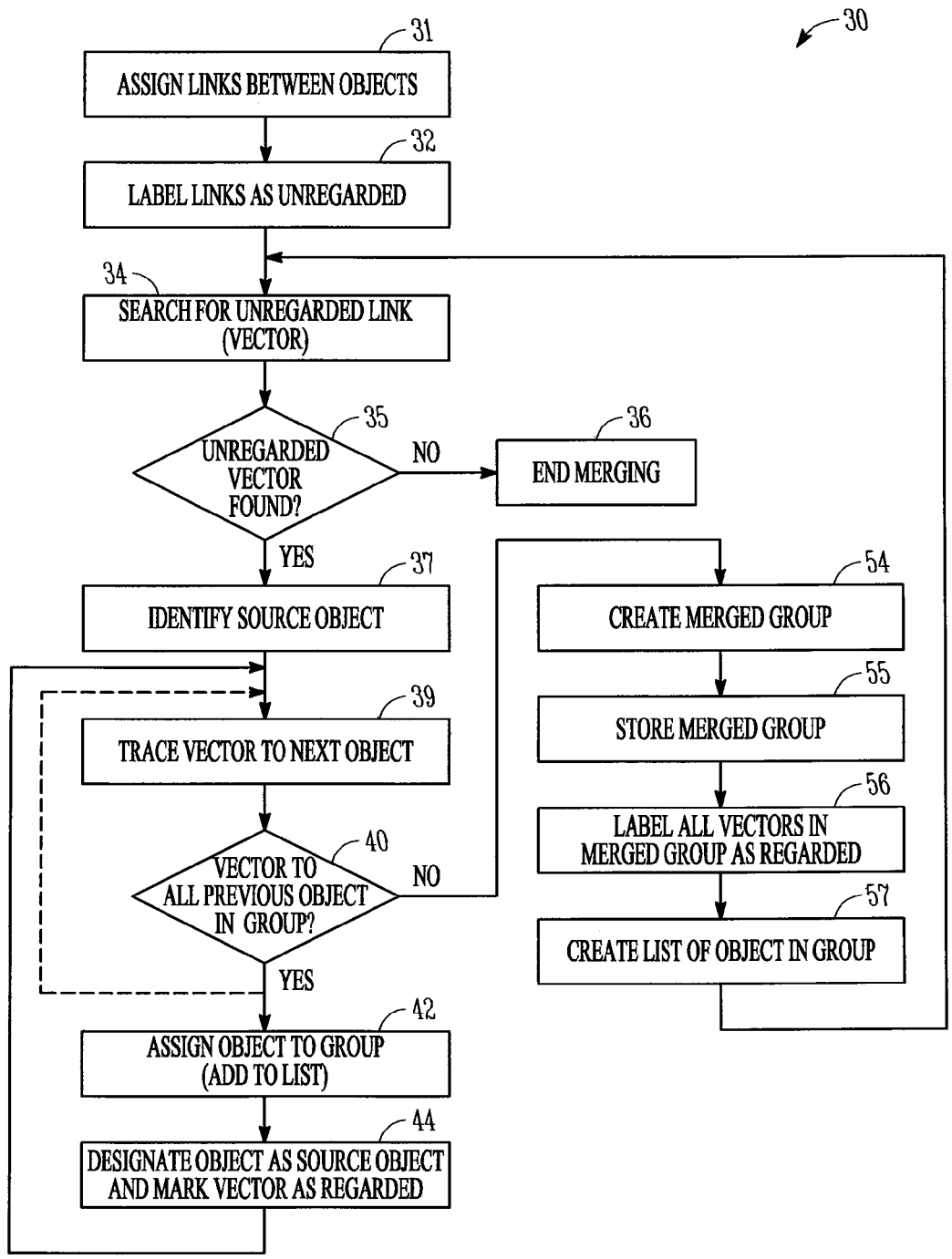
FIG. 7 is a flowchart showing a process for merging negatively key-mapped groups.

In FIG. 7, at initialization, process 30 assigns (31) links between objects. The links may be assigned between all negatively key-mapped objects in the database or to some subset thereof (e.g., user-designated groups or groups identified as containing redundant objects). In this implementation, these links are vectors. For each object pair, a link includes complementary vectors, meaning two vectors pointing in opposite directions, e.g., a vector from object A to object B and a vector from object B to object A. Duplicate vectors are deleted and the vectors are labelled (32) "unregarded", meaning that the vectors have not been traced by process 30 as part of the merging process described below. By contrast, a "regarded" vector has been traced by process 30.

Following vector assignment, the following becomes evident. In a negatively key-mapped group of n objects, there are (n*(n−1)/2) links or (n*(n−1) vectors among the n objects. An object that belongs to a negatively key-mapped group of n objects has a link to all other objects of the group. The source point of n−1 vectors to other objects is the target point of n−1 vectors from other objects. Negatively key-mapped groups that share more than one object also share links/vectors.

Process 30 searches (34) for an unregarded vector among the assigned vectors. In this example, process 30 finds (35) vector 36 from object A to object B. Process 30 identifies (37) the source object, in this case, object A, and adds object A to a list of objects that are to be part of the current merged group. Process 30 traces (39) the unregarded vector 36 from the current object, A, to a next object that is not already assigned to the merged group, in this case, object B. Process 30 determines (40) whether the current object, in this case object B, is linked to vectors that point to all remaining objects in the merged group. In this case, object B includes a vector 41 that points back to object A. Therefore, process 30 assigns (42) object B to the merged group, and labels/marks (44) vector 36 as regarded. That is, process 30 adds object B to a list that includes objects that are to be part of the merged group. Object B is then designated (44) as the source object.

The foregoing is repeated for object B. More specifically, process 30 traces (39) an unregarded vector 45 from the current object, B, to a next object that is not already assigned to the merged group, in this case, object C. Process 30 determines (40) whether the current object, in this case object C, is linked to vectors that point to all remaining objects in the merged group. In this case, object C includes a vector 46 that points back to object B and a vector 47 that points to object A. Therefore, process 30 assigns (42) object C to the merged group, and labels (44) vector 45 as regarded. That is, process 30 adds object C to a list that includes objects that are to be part of the merged group. Object C is then designated (44) as the source object, and processing continues from object C forward.

More specifically, process 30 traces (39) an unregarded vector 49 from the current object, C, to a next object that is not already assigned to the merged group, in this case, object D. Process 30 determines (40) whether the current object, in this case object D, is linked to vectors that point to all remaining objects in the merged group. In this case, object D includes a vector 50 that points back to object C, a vector 51 that points to object B, and a vector 52 that points to object A. Therefore, process 30 assigns (42) object D to the merged group, and labels (44) vector 49 as regarded. That is, process 30 adds object D to a list that includes objects that are to be part of the merged group. Object D is then designated (44) as the source object, and processing continues from object D forward.

More specifically, process 30 traces (39) unregarded vectors from the current object, D, to a next object that is not already assigned to the merged group, for example, object E.

Here, as elsewhere in process 30, tracing is performed for each duplicate copy of the object (e.g., D) in the database. Process 30 determines (40) whether the current object, in this case object E, is linked to vectors that point to all remaining objects in the merged group. In this case, object E does not include a vector that points back to all remaining objects in the merged group, namely objects A, B, C and D. Accordingly, process 30 traces other unregarded vectors from object D to objects F,G,H,I,J,K,L. That is, process 30 iterates through blocks 39 and 40 (as indicated by the dashed line) for all objects linked by vectors to object D. Objects F,G,H,I,J, K,L also do not include a vector that points back to all remaining objects in the merged group. These objects, namely objects E,F,G,H,I,J,K,L are therefore not added to merged group 25.

Since process 30 cannot find (40) an object having a vector that points back to all remaining objects in the merged group, process proceeds from block 39 to block 54. From there, process 30 creates (54) the merged group 25 from the list of objects that are to be part of the merged group, stores (55) the merged group in the database (via UKMS, in this implementation), and labels (56) all vectors in merged group 25 as regarded. Process 30 clears (57) the list of objects that are to be part of the merged group, and proceeds to block 34. From there, process 30 searches the database for vectors that are unregarded. In this case, process 30 may identify, e.g., vector 59 from object N to object E. Process 30 is then performed, as described above, to obtain merged group 24.

Process iterates through all vectors in the database, or through vectors that have been designated by a user until no unregarded vectors are found (35). Then, process 30 ends (60) merging. The resulting merged group 101 is depicted graphically in FIG. 10.

Processes 17 and 30 may be performed using any hardware/network configuration. For example, central server 12 may include one or more servers and/or one or more processing devices that are capable of receiving and storing data, and of communicating with clients. In the implementation of FIG. 1, server 12 includes one or more processors 62 and memory 64 that stores computer programs that are executed by processor(s) 62. Memory 64 stores a computer program 65 for communicating with its clients. Memory 64 also contains a computer program 66 to perform processes 17 and/or 30 to negatively key-map objects and merge groups of negatively key-mapped objects.

Representative client 14 may also be any type of processing device that is capable of obtaining objects and of transmitting those objects to server 12. A high-speed data link 69, such as Ethernet, may connect client 14 to server 12. The connection may be local or remote. That is, client 14 may also access server 12 via network 60.

Client 14 includes one or more processor(s) 70 and memory 71 that stores computer programs that are executed by processor(s) 70. In this regard, memory 71 stores an operating system 72, a computer program 74 that enables communication between client 14 and server 12, and a computer program 75 to perform processes 17 and/or 30 to negatively key-map objects and merge groups of negatively key-mapped objects.

Clients 15 and 16 may have hardware/software configurations that are the same as, or different than, client 14. Clients 14 to 16 may be computers or any other data processing apparatus including, but not limited to, desktop or laptop computers, or personal digital assistants ("PDAs"). Network 60 provides a communication link between server 12 and clients 14 to 16. Network 60 may include, but is not limited to, a local area network ("LAN"), a wide area network ("WAN"), the Internet, and/or a wireless link (e.g., a wireless fidelity, or "Wi-Fi", link).

Processes 17 and 30, and any modifications thereto described herein or elsewhere (referred to collectively as "the processes"), are not limited to use with the hardware and software described above; they may find applicability in any computing or processing environment and with any type of machine that is capable of running machine-readable instructions. The processes can be implemented in digital electronic circuitry, computer hardware, firmware, software, or combinations thereof.

The processes can be implemented via a computer program product, i.e., a computer program tangibly embodied in an information carrier, e.g., in a machine-readable storage device for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Actions associated with the processes can be performed by one or more programmable processors executing one or more computer programs to perform the functions of the processes. The actions can also be performed by, and the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data. Generally, a computer will also include, or be operatively coupled to receive data from, or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM, EEPROM, and flash memory devices; magnetic disks, e.g., internal hard disks or removable disks; magneto-optical disks; and CD-ROM and DVD-ROM disks.

The processes can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the processes, or any combination of such back-end, middleware, or front-end components. The components of the system can be interconnected by any form or medium of digital data communication, e.g., a communication network. Examples of communication networks include a LAN and a WAN, e.g., the Internet.

Activities associated with the processes can be rearranged and/or one or more such activities can be omitted to achieve the same results described herein. All or part of the processes may be fully automated, meaning that they operate without user intervention, or interactive, meaning that all or part of the processes may include some user intervention.

Elements of different embodiments described herein may be combined to form other embodiments not specifically set forth above. Other embodiments not specifically described herein are also within the scope of the following claims.

What is claimed is:

1. A computer-implemented method comprising:
   comparing, by one or more processors of a computer system, at least one data object with one or more other data objects to determine a similarity score for the compared data objects;
   storing, in a storage device of the computer system, a negative key mapping for the compared data objects upon determination that the similarity score associated with the compared data objects is equal to or below a dissimilarity threshold value, the negative key mapping comprising data indicating that the compared data objects are substantially different from one another;
   storing a positive key mapping for the compared data objects upon determination that the similarity score associated with the compared data objects is equal to or above a similarity threshold value set higher than the dissimilarity threshold value, the positive key mapping comprising data indicating that the compared data objects are substantially identical to one another,
   refraining from storing a key mapping for the compared data objects upon determination that the similarity score associated with the compared data objects is between the dissimilarity threshold value and the similarity threshold value; and
   clustering, by the one or more processors, only data objects determined to be substantially different from one another into a negatively key-mapped group using the negative key mapping.

2. The method of claim 1, wherein storing comprises storing the negative key mapping via a unified key mapping service (UKMS).

3. The method of claim 2, further comprising:
   storing the positive key mapping for at least one of the data objects via the UKMS.

4. The method of claim 1, wherein the negative key mapping comprises a first negative key mapping and a second negative key mapping, the first negative key mapping defining a first group of data objects and the second negative key mapping defining a second group of data objects; and
   wherein the method further comprises merging the first group with the second group to produce a merged group;
   wherein merging comprises discarding redundant data objects from the merged group.

5. The method of claim 1, wherein the negative key mapping comprises a first negative key mapping and a second negative key mapping, the first negative key mapping defining a first group of data objects and the second negative key mapping defining a second group of data objects;
   wherein the method further comprises merging the first group with the second group; and
   wherein merging comprises:
      assigning links between data objects in the first and second groups;
      starting with a first data object, tracing links until a last data object is reached that does not have a link that connects at least to the first data object; and
      assigning data objects associated with traced links to a merged group;
      wherein the first data object may be part of the first group or the second group, and the last data object may be part of the first group or the second group.

6. The method of claim 5, wherein each link comprises first and second vectors, the first vector being a complement to the second vector in that the first vectors points in a direction that is opposite to direction that the second vector points;
   wherein tracing is performed via directions specified by vectors between corresponding data objects.

7. The method of claim 6, further comprising:
   after tracing the first vector or the second vector of a link between two data objects, the method further comprises assigning an indication to the first vector and the second vector to indicate the tracing.

8. The method of claim 7, wherein the merged group comprises a first merged group; and wherein the method further comprises:
   after assigning, identifying a vector between data objects that does not include the indication that indicates tracing;
   starting with an initial data object, tracing links until a final data object is reached that does not have a link that connects to the initial data object and to all data objects that were traced between the initial data object and the final data object; and
   assigning data objects associated with traced links to a second merged group.

9. The method of claim 8, further comprising:
   replacing the first and second groups with the first merged group and the second merged group.

10. One or more machine-readable media comprising instructions that are executable by one or more processing devices to:
    compare, at a computer system, at least one data object with one or more other data objects to determine a similarity score for the compared data objects;
    store, in a storage device of the computer system, a negative key mapping for the compared data objects upon determination that the similarity score associated with the compared data objects is equal to or below a dissimilarity threshold value, the negative key mapping comprising data indicating that the compared data objects are substantially different from one another;
    store a positive key mapping for the compared data objects upon determination that the similarity score associated with the compared data objects is equal to or above a similarity threshold value set higher than the dissimilarity threshold value, the positive key mapping comprising data indicating that the compared data objects are substantially identical to one another,
    refrain from storing a key mapping for the compared data objects upon determination that the similarity score associated with the compared data objects is between the dissimilarity threshold value and the similarity threshold value; and
    cluster only data objects determined to be substantially different from one another into a negatively key-mapped group using the negative key mapping.

11. The one or more machine-readable media of claim 10, wherein storing comprises storing the negative key mapping via a unified key mapping service (UKMS).

12. The one or more machine-readable media of claim 11, further comprising instructions that are executable by the one or more processing devices to:
    store the positive key mapping for at least one of the data objects via the UKMS.

13. The one or more machine-readable media of claim 10, wherein the negative key mapping comprises a first negative key mapping and a second negative key mapping, the first negative key mapping defining a first group of data objects and the second negative key mapping defining a second group of data objects; and wherein the one or more machine-readable media further comprise instructions that are executable by the one or more processing devices to merge the first group with the second group to produce a merged group;

wherein merging comprises discarding redundant data objects from the merged group.

14. The one or more machine-readable media of claim 10, wherein the negative key mapping comprises a first negative key mapping and a second negative key mapping, the first negative key mapping defining a first group of data objects and the second negative key mapping defining a second group of data objects;

wherein the one or more machine-readable media further comprises instructions that are executable by the one or more processing devices to merge the first group with the second group; and wherein merging comprises:

assigning links between data objects in the first and second groups;

starting with a first data object, tracing links until a last data object is reached that does not have a link that connects at least to the first data object; and assigning data objects associated with traced links to a merged group;

wherein the first data object may be part of the first group or the second group, and the last data object may be part of the first group or the second group.

15. The one or more machine-readable media of claim 14, wherein each link comprises first and second vectors, the first vector being a complement to the second vector in that the first vectors points in a direction that is opposite to direction that the second vector points;

wherein tracing is performed via directions specified by vectors between corresponding data objects.

16. The one or more machine-readable media of claim 15, further comprising instructions that are executable by the one or more processing devices to:

after tracing the first vector or the second vector of a link between two data objects, assign an indication to the first vector and the second vector to indicate the tracing.

17. The one or more machine-readable media of claim 16, wherein the merged group comprises a first merged group; and wherein the one or more machine-readable media further comprise instructions that are executable by the one or more processing devices to:

after assigning, identify a vector between data objects that does not include the indication that indicates tracing;

start with an initial data object, tracing links until a final data object is reached that does not have a link that connects to the initial data object and to all data objects that were traced between the initial data object and the final data object; and assign data objects associated with traced links to a second merged group.

18. The one or more machine-readable media of claim 17, further comprising instructions that are executable by the one or more processing devices to:

replace the first and second groups with the first merged group and the second merged group.

19. The method of claim 1, wherein the data objects are part of master data that is relevant to data processing activities at different data processing devices.

20. The method of claim 1, wherein the storing the negative key mapping includes storing a positive key mapping for the compared data objects if the similarity score associated with the compared data objects is equal to or above a similarity threshold value set higher than the dissimilarity threshold value, the positive key mapping comprising data indicating that the compared data objects are substantially identical to one another.

21. The method of claim 20, wherein the storing the negative key mapping includes refraining from storing a key mapping for the compared data objects if the similarity score associated with the compared data objects is between the dissimilarity threshold value and the similarity threshold value.

22. A computer-implemented system comprising:

memory to store data objects;

one or more processor operatively coupled to the memory, each processor configured to:

compare at least one data object with one or more other data objects to determine a similarity score for the compared data objects;

store a negative key mapping for compared data objects upon determination that the similarity score associated with the compared data objects is equal to or below a dissimilarity threshold value, the negative key mapping comprising data indicating that the compared data objects are substantially different from one another;

store a positive key mapping for the compared data objects upon determination that the similarity score associated with the compared data objects is equal to or above a similarity threshold value set higher than the dissimilarity threshold value, the positive key mapping comprising data indicating that the compared data objects are substantially identical to one another;

refrain from storing a key mapping for the compared data objects upon determination that the similarity score associated with the compared data objects is between the dissimilarity threshold value and the similarity threshold value; and cluster only data objects determined to be substantially different from one another into a negatively key-mapped group using the negative key mapping.

\* \* \* \* \*